United States Patent [19]

Schröder et al.

[11] Patent Number: 4,603,004

[45] Date of Patent: Jul. 29, 1986

[54] LATENT HEAT STORAGE MEDIUM, METHOD OF MANUFACTURING A NUCLEATING AGENT AND LATENT HEAT STORAGE DEVICE

[75] Inventors: Johann Schröder; Vera Piel-Nicklich, both of Aachen, Fed. Rep. of Germany

[73] Assignee: U.S. Philips Corporation, New York, N.Y.

[21] Appl. No.: 716,278

[22] Filed: Mar. 26, 1985

[30] Foreign Application Priority Data

Mar. 28, 1984 [DE] Fed. Rep. of Germany ....... 3411399

[51] Int. Cl.$^4$ ................................................ C09K 5/06
[52] U.S. Cl. ........................................ 252/70; 165/10; 165/104.17; 423/53; 423/55; 423/593; 423/606
[58] Field of Search ............... 252/70; 165/10, 104.17, 165/DIG. 4; 423/53, 55, 593, 606

[56] References Cited

U.S. PATENT DOCUMENTS 4,083,922 4/1978 Kasserra ............................ 423/593
4,351,808 9/1982 Beckstead et al. .................... 423/53

FOREIGN PATENT DOCUMENTS 102982  6/1982 Japan ..................................... 252/70
139169  8/1982 Japan ..................................... 252/70
138290  8/1984 Japan ..................................... 252/70
1255331 12/1971 United Kingdom .

*Primary Examiner*—Paul Lieberman
*Assistant Examiner*—Robert A. Wax
*Attorney, Agent, or Firm*—Norman N. Spain

[57] ABSTRACT

The precipitation product of sodium tungstate dihydrate from a melt of sodium acetate-trihydrate is a nucleating agent for latent heat storage medium on the basis of sodium acetate-trihydrate, which produces a sure and from the first storage cycle on defect-free nucleation of the sodium acetate-trihydrate at the melting point or only a few degrees below the melting point.

5 Claims, 2 Drawing Figures

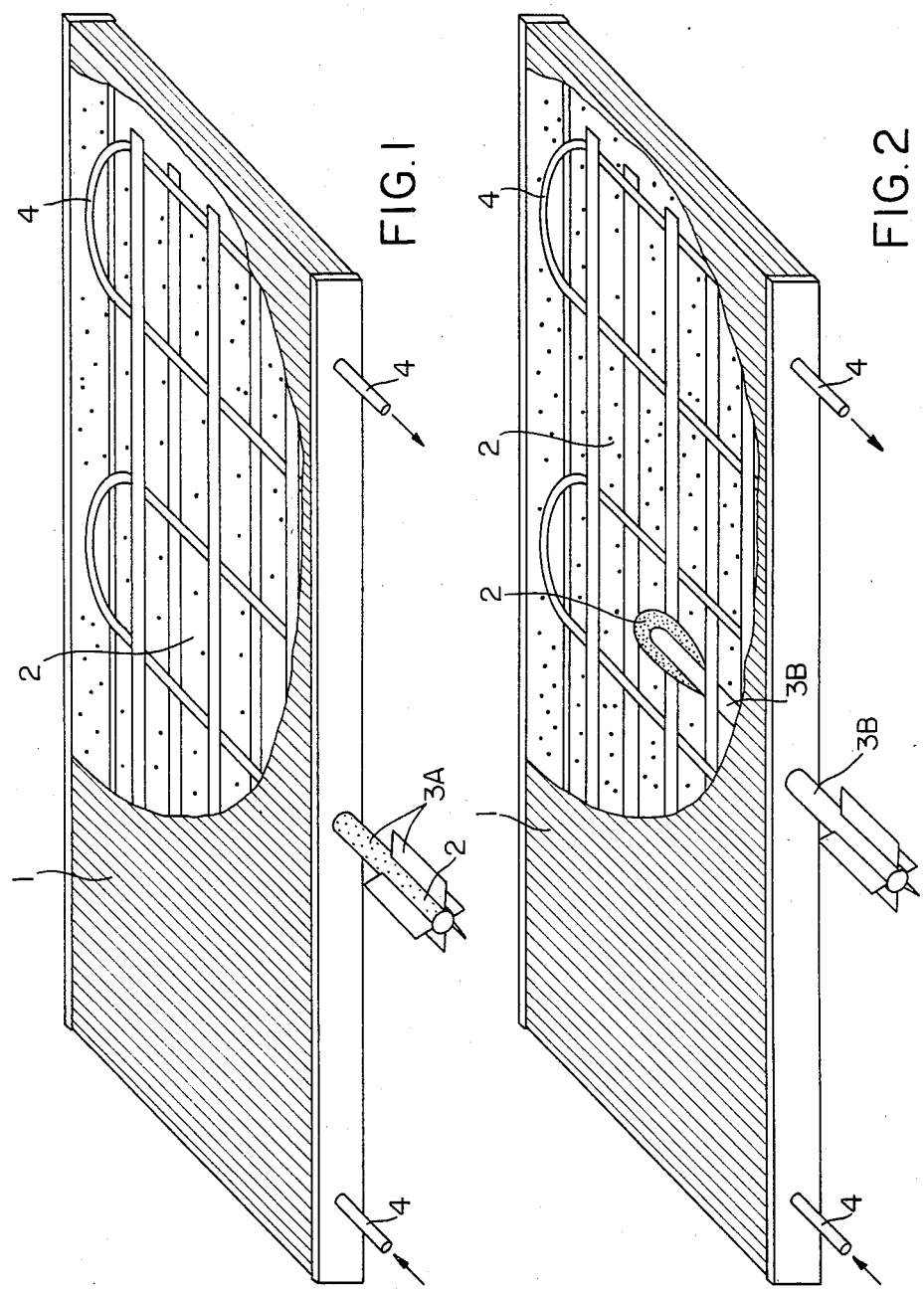

LATENT HEAT STORAGE MEDIUM, METHOD OF MANUFACTURING A NUCLEATING AGENT AND LATENT HEAT STORAGE DEVICE

The invention relates to a latent heat storage medium on the basis of sodium acetate-trihydrate and a nucleating agent. The invention furthermore relates to a method of manufacturing such a nucleating agent and a latent heat storage device which comprises a latent heat storage medium on the basis of sodium acetate-trihydrate and such a nucleating agent.

Sodium acetate-trihydrate, $NaOOCCH_3 \cdot 3H_2O$ is particularly suitable as a material for storing heat. It has both a high heat of fusion of 243.8 $kJ/dm^3$ and also large heat capacities of 4.58 $kJ/dm^3K$ in the liquid phase and 2.79 $kJ/dm^3K$ in the solid state. The melting-point of 85° C. moreover is very favorable for many technical applications.

A decisive disadvantage of sodium-acetate-trihydrate for such practical application possibilities, however, is its strong tendency to supercooling so that instead of at the melting point, crystallization occurs only at substantially lower temperatures of approximately 15° C. to −15° C. Whereas spontaneous crystallization for stoichiometric $NaOOCCH_3 \cdot 3H_2O$ becomes significant only below 10° C., spontaneous crystallization in more diluted solutions (for example with 5% by weight of water addition) occurs only at even lower temperatures (for example ±0° C.).

From Chem. Abstr. 97 (1982) 58634d and JP.Kokai 57-74 380 it is known to manufacture a medium to prevent supercooling, i.e. a nucleating agent, in that a mixture of $Na_4P_2O_7 \cdot 10H_2O$ with $NaOOCCH_3 \cdot 3H_2O$ is heated at 75° C. Upon cooling a moulded body is obtained which consists of two layers. The pyrophosphate layer is burnt away, while the remaining body consisting of $Na_4P_2O_7 \cdot 10H_2O + nNaOOCCH_3 \cdot 3H_2O$, optionally cut to pieces, is used as a nucleating agent for $NaOOCCH_3 \cdot 3H_2O$. The disadvantage of this method is that the separation of the nucleating agent in the solid phase can be carried out with difficulty only in the production process and hence leads to fluctuating and poorly reproducible results. Moreover, the nucleating agent thus manufactured becomes ineffective upon heating above a temperature of 88° C.

From Chem. Abstr. 76 (1972) 74176c and GB-PS 12 55 331 another type of heat storage medium is known, namely doped crystalline materials, in which polymorphous phase conversions occur. The heat storage is based on the conversion enthalpy. The doping prevents the supercooling. Suitable doping crystals are epitaxial and/or isomorphous and/or isotypical with the low temperature form of the host crystal. As an example there is mentioned that $Na_2MoO_4$ which has an ortho-rhombic low temperature form is doped with $Na_2WO_4$ in the ratio of $10^7:1$. These publications do not provide a teaching of a latent heat storage media on the basis of sodium acetate-trihydrate, because the phase transition solid-liquid occurring in the last-mentioned storage medium is not a polymorphous phase conversion.

It is the object of the invention to provide a nucleating agent for a latent heat storage medium based on sodium acetate-triydrate which produces a sure and, from the very first storage cycle on, a defect-free nucleation of the sodium acetate-trihydrate at the melting point or only a few degrees (<10° C.) below the melting point.

According to the invention this object is achieved in that the latent heat storage medium comprises as a nucleating agent the precipitation product of sodium tungstate-dihydrate from a melt of sodium acetate-trihydrate.

For the manufacture of the precipitation product according to the invention a mixture of 20 to 25% by weight of $NaWO_4 \cdot 2H_2O$ with 80 to 75% by weight of $NaOOCCH_3 \cdot 3H_2O$ is heated at 70° to 80° C. The suspension of solid tungstate in melted acetate formed is now supercooled to such an extent that at temperatures of −20° to −40° C. a spontaneous crystallization of the melt occurs. The mixture is now again heated at 70° to 80° C. and the sodium acetate melt is decanted and filtered from the solid phase while hot. The filter residue is then washed with ethanol and dried in air.

The product thus obtained whose accurate composition and structure is still unknown, added to sodium acetate-trihydrate in quantities of 0.4 to 3% by weight, acts as a sure nucleating agent which, from the first storage cycle on, initiates the crystallization at the melting point or only a few degrees (<10° C.) therebelow.

In a specific embodiment of making the nucleating agent 25 g of sodium tungstate-dihydrate, $NaWO_4, 2H_2O$ are mixed with 75 g of sodium acetate-trihydrate, $NaOOCCH_3 \cdot 3H_2O$ and heated up to 75° C. The suspension of solid tungstate in melted acetate formed this way is then put in a freezer until at a temperature of about −25° C. spontaneous crystallization occurs. The mixture is now heated up again to 75° C. and after a short sedimentation period the liquid phase is decanted and filtered from the solid precipitate. In order to keep the temperature of the mixture above melting-temperature of the sodium acetate-trihydrate the filtering is carried out in a hot water funnel. The filter residue is then washed with ethanol and dried in air.

The product thus obtained is added to sodium acetate-trihydrate in a proportion of 1% by weight. In repeated melting cycles this mixture shows reliable nucleation at temperatures between 50° and 59° C.".

The quantity of nucleating agent required for a reliable crystallization is only 0.4% by weight, calculated on stoichiometric sodium acetate-trihydrate. Deviations of up to 5% by weight from the stoichiometric composition have no essential influence on the nucleation.

However, for the nucleation to be sure there is one restriction: the storage medium in its totality must never be heated above a temperature of 83° C., since as a result of this the nucleation effect achieved by the pretreatment would be lost.

The operating temperature in most applications will however hardly be raised so high above the melting point of 58° C. that the coldest spot of the total store becomes hotter than 83° C. If, however, in special cases this could not be excluded with certainty, it may be ensured, by simple constructions, that at least a small part of the storage medium in which solid nucleating agent is present and which is in direct connection with the overall remaining storage medium is not heated above 83° C.

These structural measures explained hereinafter in connection with the nucleating agent also form part of the present invention.

In the simplest case it can be ensured by use of a locally diminished heat supply (insulation) with respect to the heat source and/or a locally better heat dissipation (cooling area) to a colder atmosphere that a small part of the storage device (for example a corner at the bottom of a square storage container) in all possible operating conditions does never attain a temperature above 83° C.).

The constructions as explained hereinbefore are discussed more in detail with reference to the accompanying drawing in which:

FIG. 1 shows a first embodiment of a such a construction,

FIG. 2 shows a second embodiment of a such a construction.

In the drawing the reference numerals have the following meaning:

1 is a storage container with a corrugated steelwall.
2 is a storage medium $NaOOCCH_3, 3H_2O$ with 0.4% by weight of a nucleating agent according to the invention.
3A is a hollow cooling tube carrying cooling fins filled with the storage medium and nucleating agent 2 being in open contact with the contents of the container the other end being closed.
3B is a cooling rod carrying cooling fins.
4 is a heat exchanger consisting of a tube filled with a heat exchanging fluid.

The container 1 in FIG. 1 is provided with a tube 3A closed at one end, the inner volume of which is in open contact with the storage medium and solid nucleating agent 2. The tube 3A projects from the storage container 4 into the cooler atmosphere.

Alternately, a good heat conductor 3B (for example a copper or aluminum rod or also a heat conducting pipe) which is in heat exchanging contact with the cooler atmosphere may project in the storage container 1 (FIG. 2) in such manner that a small part of the storage medium with solid, aged nucleating agent 2 can in no operating phase become hotter than 83° C.

What is claimed is:

1. A latent heat storage medium based on sodium acetate-trihydrate and a nucleating agent, characterized in that as a nucleating agent it comprises the precipitation product of sodium tungstate-dihydrate from a melt of sodium acetate-trihydrate, wherein the nucleating agent is present in a quantity of 0.4 to 3% by weight calculated on the stoichiometric sodium acetate-trihydrate.

2. A method of manufacturing the nucleating agent for the latent heat storage medium as claimed in claim 1, characterized in that a mixture of 20 to 25% by weight of sodium tungstate-dihydrate with 80 to 75% by weight of sodium acetate-trihydrate is heated at 70° to 80° C., the resulting suspension of solid tungstate in melted acetate is supercooled to such an extent that at temperatures of $-20°$ to $-40°$ C. a spontaneous crystallization of the melt occurs, the mixture is heated again at 70° to 80° C., the sodium acetate melt is decanted and filtered off from the solid phase while hot and the filter residue is washed with ethanol and dried in air.

3. A latent heat store with a latent heat storage medium and a nucleating agent as claimed in claim 1, characterized by a locally diminished heat supply with respect to a heat source and/or a locally better heat dissipation to a colder atmosphere which are formed so that a small part of the store in all possible operating conditions never becomes hotter than 83° C.

4. A latent heat store with a latent heat storage medium and a nucleating agent as claimed in claim 1, characterized in that a part of a container which is in direct contact with the storage medium and is filled with the storage medium and nucleating agent projects from the container into a colder atmosphere.

5. A latent heat store with a latent heat storage medium and a nucleating agent as claimed in claim 1 in a storage container, characterized in that a good heat conductor which is in conductive connection with a cooler atmosphere projects into the storage container in such manner that a small part of the storage medium in which solid, aged nucleating agent is present can, during no operating phase, become hotter than 83° C.

* * * * *